United States Patent [19]

Weyandt

[11] Patent Number: 4,901,506
[45] Date of Patent: Feb. 20, 1990

[54] HEAT SEAL TEMPERATURE CONTROL

[75] Inventor: Ronald R. Weyandt, Chesterland, Ohio

[73] Assignee: Automated Packaging Systems, Inc., Twingsburg, Ohio

[21] Appl. No.: 366,301

[22] Filed: Jun. 13, 1989

Related U.S. Application Data

[63] Continuation of Ser. No. 31,750, Mar. 30, 1987, abandoned.

[51] Int. Cl.$^4$ .................. B65B 51/14; B65B 51/30; B65B 7/06
[52] U.S. Cl. ......................... 53/479; 53/570; 53/373; 219/86.41; 219/91.1; 219/110; 219/111; 219/252; 219/497
[58] Field of Search .............. 53/373, 570, 477, 479; 219/86.41, 91.1, 110, 111, 240, 241, 251, 252, 264, 497, 499, 505

[56] References Cited

U.S. PATENT DOCUMENTS

| | | |
|---|---|---|
| 3,113,198 | 12/1963 | Shinn . |
| 3,394,244 | 7/1968 | Smith, Jr. . |
| 3,564,204 | 2/1971 | Mense . |
| 3,575,766 | 4/1971 | McArthur et al. . |
| 3,617,696 | 11/1971 | Malone et al. . |
| 3,679,518 | 7/1972 | Andler et al. . |
| 3,699,305 | 10/1972 | Reenstra et al. . |
| 3,721,801 | 3/1973 | Bate . |
| 3,752,956 | 8/1973 | Cahill et al. ............... 219/497 X |
| 3,789,190 | 1/1974 | Orosy et al. ............... 219/497 |
| 3,869,597 | 3/1975 | Strange ..................... 219/497 X |
| 3,948,015 | 4/1976 | Lerner . |
| 3,959,692 | 5/1976 | Wetzel ..................... 219/497 X |
| 3,965,330 | 6/1976 | Williams . |
| 3,965,653 | 6/1976 | Lerner . |
| 4,017,713 | 4/1977 | Lodi . |
| 4,350,870 | 9/1982 | Nakayama et al. . |
| 4,523,084 | 6/1985 | Tamura et al. ............. 219/497 |
| 4,554,439 | 11/1985 | Cross et al. ............... 219/497 |
| 4,590,363 | 5/1986 | Bernard ..................... 219/497 |
| 4,636,619 | 1/1987 | Sugimori ................... 219/497 |
| 4,638,960 | 1/1987 | Straube et al. ............ 219/497 X |
| 4,695,709 | 9/1987 | Sachs et al. ............... 219/497 X |
| 4,705,937 | 11/1987 | Marek ....................... 219/497 |
| 4,736,091 | 4/1988 | Moe ........................... 219/497 X |

FOREIGN PATENT DOCUMENTS

2549651 12/1976 Fed. Rep. of Germany .
1520556 8/1978 United Kingdom .

Primary Examiner—Horace M. Culver
Attorney, Agent, or Firm—Watts, Hoffmann, Fisher & Heinke Co.

[57] ABSTRACT

Method and circuitry is disclosed for controlling and stabilizing temperature of a resistance heat sealing element used in packaging operations. Temperature of the heat sealing element is measured by monitoring its resistance by means of a current sensing resistor placed in series with the heat sealing element. The resistivity of the heat sealing element is a function of temperature and current measurement, assuming substantially constant applied voltage, is an accurate measure of sealing element temperature. The circuitry reduces application of electric power to the sealing element in response to current in the sealing element dropping below a predetermined level. The circuit either continues application of electric power, or increases it, in response to the current being above the predetermined level. Circuitry is also provided for compensating for undesirable line voltage changes to maintain the heating element at a constant temperature. Means is provided for adjusting the predetermined temperature at which power cut off occurs. The circuit and sealing element can be operated in either a continuous manner of in a "one-shot" fashion which has been determined as particularly useful for making seals which bear embossed indicia.

27 Claims, 2 Drawing Sheets

HEAT SEAL TEMPERATURE CONTROL

This application is a continuation, of application Ser. No. 031,750, filed 3-30-87 and now abandoned.

TECHNICAL FIELD

This invention relates generally to packaging by heat sealing of thermo-plastic containers, and more specifically to circuitry and method for controlling temperature of heat sealing for carrying out a rapid series of sealing operations for effecting uniformly high quality heat seals of the containers.

BACKGROUND ART

It is well known to package small items and finer bulk materials in sealed thermo-plastic bags. Such packages are known as particularly effective in protecting the products sealed therein and in facilitating viewing of the contents without opening the bag.

Systems, apparatus and methods have been devised to effect automatic and semi-automatic packaging in such bags. Examples of such apparatus, systems and methods are shown in U.S. Pat. Nos. 3,948,015, issued on Apr. 6, 1976 and in 3,965,653, issued on June 29, 1976, both of which are herein expressly incorporated by reference.

Commercial equipment has been sold for performing these automatic and semi-automatic packaging functions, two exemplary machines being known as the Model H-100 and the Model H-55, manufactured and sold by Automated Packaging Systems, Inc. of Twinsburg, Ohio, USA.

Packaging apparatus and systems embodied by the above identified machines use webs of interconnected heat-sealable thermo-plastic bags. The bags are successively fed to a loading and sealing station where they are opened by an air flow system and loaded.

The loaded bags are successively sealed and then detached one from another.

In sealing, a member grips each loaded bag successively and isolates a region of the bag where a heat seal is to be formed. A heater element is moved, relative to the isolated region, proximate or impinging against the desired seal area. Electric power applied to the heater element heats the seal area region to a temperature sufficiently high to effect a heat seal of the loaded bag. Subsequently, the loaded bags are successively detached from the web. Alternately, the heater element is stationary, and a pressure member forces the seal area against the heater.

The apparatus described above is usually employed to make a long rapid succession of seals of successive bags. In such an application, the heater element is kept hot, i.e., maintained at approximately a uniform temperature.

Other types of sealing operations, however, are also of interest. Continuous sealing is a type of sealing in which a continuous heated heater element is maintained in substantially continuous contact with moving material to be sealed. Such continuous sealing can be applied, for example, in making of the heat sealable plastic bags. To do this, one begins with a length of large diameter plastic tubing. The tubing is laid flat, and a "hot knife" heater element is moved relatively along the longitudinal direction of the large tube, which makes a longitudinal seal extending along the large tube, in order to convert the large diameter tube to two or more smaller diameter tubes.

Still another sealing application is of the intermittent variety, such as where low volume bag sealing is done at time intervals which may be spaced a varying and considerable amount, one from another. In such applications, temperature control is very important, since intermittent application results in thermal transients occurring within the machine and the heater element which can interfere with good sealing. If the intervals are short, thermal build-up can occur and the heater element can become too hot. On the other hand, if intervals between sealing cycles are long, insufficient heat build-up may take place, and the heater element will be too cold for effective sealing.

Maintenance of heating element temperature to within a relatively precise range is important for making consistently good quality heat seals. If the heater element temperature is too low, the material to be sealed will not be sufficiently softened and sealing may be incomplete. If, on the other hand, heater element temperature is too high, the thermo-plastic material to be sealed will melt excessively, which can result in burning through one or both layers of plastic material and will cause the seal to be defective.

According to one proposal for temperature control, line voltage is coupled to the heating element and its circuit element values are simply selected to maintain the heating element at a predetermined desired temperature as long as the line voltage is applied. This proposal suffers from the disadvantage that, if line voltage changes, so will heating element temperature, and sometimes this change can be sufficient to adversely affect the quality of the seals made.

According to another proposal, the temperature of the heating element is monitored by a heat sensing device, such as a thermocouple or the like, and output from the thermocouple is sensed. This output is connected in feedback fashion to control circuitry for adjusting the energy applied to the heating element. A problem with this approach is that the accuracy of such temperature monitoring devices is sometimes not sufficiently great. A further problem results from the fact that such temperature monitoring devices monitor the temperature of the heater element from a distance which, though small, can result in inaccurate temperature indications. This is particularly true where ambient temperature is relatively low, or where drafts are present.

Another proposal has been to use a thermistor positioned and coupled to cut off application of power to the heating element for a significant period of time when the heating element is removed from proximity to the seal area.

Another proposal has been to employ a temperature sensitive element near the heater element, whose resistance changes with temperature, and to utilize that change in resistance to actuate control circuitry for adjusting power applied to the heater element.

These last two proposals suffer from the same disadvantage as the previously mentioned proposal, in that temperature sensing is done by sensing heat output from the heater element, rather than by directly sensing the temperature of the heater element itself.

Thus far, this discussion has been primarily directed to the type of repetitive sealing operation wherein a heating element is desired to be held at a substantially uniform heat sealing temperature and the element is rapidly applied to a succession of desired seal areas.

Another type of desirable seal is a seal having a relatively large seal area on which indicia is embossed. Such indicia can comprise for example, the logo or name of the entity which manufactures or sells the bag contents. Another use can comprise indication of the identity of the person or opertor who performed the sealing operation, or who counted or inspected the contents of the bag.

A practical application of such a use is the packaging of precounted amounts of currency in plastic bags for banks.

Embossed seals also have utility for security applications, where it is desirable to provide a seal such that the container cannot easily be opened and resealed by an unauthorized person without the fact of such intrusion being detectable. For example, one cannot, without leaving evidence, open a container known to have an embossed seal and simply reseal it with a plain heater element having no indicia.

Even if it is not desired to emboss into the seal area a logo, name or number, it may nonetheless be desirable for security purposes to emboss a predetermined geometrical pattern into the seal area which is relatively difficult to duplicate.

The procedure for making embossed seals is somewhat different from that described above. To make an embossed seal, the heater element is made in the form of a bar, mating with a clamping surface bearing raised pattern corresponding to the desired indicia. The layers of the container to be sealed are then inserted between the jaws of a clamp apparatus, at least one portion of which bears or consists of the heating element. The clamp is closed prior to application of electric power to the heater element. Electric power is then applied to the heater element which heats the area desired for the seal to a point at which the seal is effected. Power is then cut off from the heating element and the clamped assembly is allowed to cool, after which the clamp is released and the sealed container removed prior to the initiation of another sealing cycle.

Private tests have shown that good quality embossed seals are difficult to make. Legibility of the indicia has sometimes appeared inconsistent with making seals with good mechanical properties. Seal quality control has been sought by adjusting the time of down application to the resistive heating element. One problem with this approach appears to arise in instances in which a long succession of sealing cycles is needed. Presumably because of transient thermal conditions during a succession of sealing operations, the duration of heat application to effect a good seal varies considerably over a sequence of seals. Such time durations have been seen to vary from between 1½ seconds to about 0.3 seconds. This need for continuous timing control has made impractical the making of successions of embossed seals.

The necessity for varying the time of heat application has been a substantial obstacle to making rapid successions of good embossed heat seals.

It is a general object of the present invention to provide a heat sealing method and circuit for effecting, as desired, (1) precise maintenance of a heat sealing element at substantially a predetermined temperature and (2) operation of a heat sealing element in a uniformly timed series cycles for making consistently good embossed seals.

DISCLOSURE OF INVENTION

The disadvantages of the prior art are reduced or overcome by the method, apparatus and circuitry of the present invention. In accordance with the method for stabilizing temperature of an electrically heated sealing element coupled to an energization circuit for applying electrical power to heat the sealing element, the method comprises the steps of monitoring an electrical characteristic of the sealing element which is a function of sealing element temperature and adjusting operation of the energization circuit in response to that monitoring step. More specifically, the preferred embodiment calls for monitoring changes in the resistance of the sealing element.

This approach to temperature control is significantly superior to the prior art approaches of monitoring voltage input to the sealing element circuit, or of monitoring the temperature of the sensing element by a heat sensor, such as a thermocouple. A heat sensor is capable only of sensing the temperature of the air near the heating element, and not the actual heating element temperature itself.

The method of this invention, on the other hand, provides a way to sense directly the actual heating element temperature, rather than sensing air temperature near the heating element and inferring heating element temperature from that measurement. This directness of heating measurement facilitates maintaining heating element temperature more accurately stabilized.

In a more specific embodiment, resistance of the heating element is continuously measured by measuring current flowing through the heating element during the application of a substantially constant voltage. In the preferred embodiment, a current sensing resistor is placed in series with the heating element, and the current is monitored by continuously measuring the voltage drop across the sensing resistor.

This method and circuitry provides a highly accurate continuous measurement of the resistance of the heating element, which is a direct function of its temperature, when the heating element includes material whose resistivity changes in response to changes in temperature. This characteristic is shared by virtually conductive materials.

In a preferred embodiment, adjustment of the energization circuit is performed as follows: when current through the sealing element is reduced to a level below a predetermined value, application of electric power to the sealing element is reduced as well; when, on the other hand, current in the sealing element is above a predetermined value, application of electric power is either continued at a uniform level, or is increased.

Thus, as heating element temperature rises, so does its resistance, and the current through the heating element, assuming substantially constant voltage, is reduced. The circuit of this invention senses reduction of this current (indicating sealing element temperature. rise) below a predetermined level corresponding to a desired temperature. In response to current dropping below that predetermined level, the electric power is reduced, or cut off all together, since the heating element desired temperature is satisfied.

If, on the other hand, current is above the predetermined value, this indicates that heating element temperature (as indicated by its relatively low resistance) is below the desired temperature, and the circuit applies electric power to raise that temperature.

In a preferred embodiment, circuitry, including a comparator, is provided for adjusting the predetermined level at which the circuit of this invention turns the power on and off.

In a more specific embodiment, the circuit includes additional circuitry for compensating for undesired changes in the line voltage applied to the sealing element circuit. When voltage drops, the voltage compensation circuitry extends the period of sealing element heating to compensate for the loss of voltage and to maintain actual power dissipated in the heating element at a substantially constant level, notwithstanding the voltage change. If voltage rises, the heating period is shortened, for complimentary reasons.

In a more specific embodiment, the means for adjusting the predetermined temperature at which power cut off occurs includes a potentiometer. In the specific embodiment, two other potentiometers are coupled to the temperature adjustment potentiometer to define the range of temperatures achievable by full excursion of the movable selector portion of the temperature adjustment potentiometer.

Circuitry in accordance with this invention can be operated on a continuous basis, or can be operated to effect a succession of sealing operations in a one-shot fashion for each cycle. Such sealing operations are particularly effective for making seals bearing embossed indicia.

In order to make such an embossed seal, the area to be sealed is clamped by a clamping device, one or both jaws of which comprise resistance sealing elements. The circuit is then triggered to initiate application of electric power to the heating elements. The circuit continues application of power until the heating element reaches the predetermined temperature, at which time the power is cut off and the assembly allowed to cool. After cooling, the assembly is unclamped and the sealed item removed in preparation for the initiation of the next one-shot cycle.

Understanding of the present invention will be facilitated by reference to the following specific description, and to the drawing.

BEST MODE FOR CARRYING OUT THE INVENTION

Figure 1:
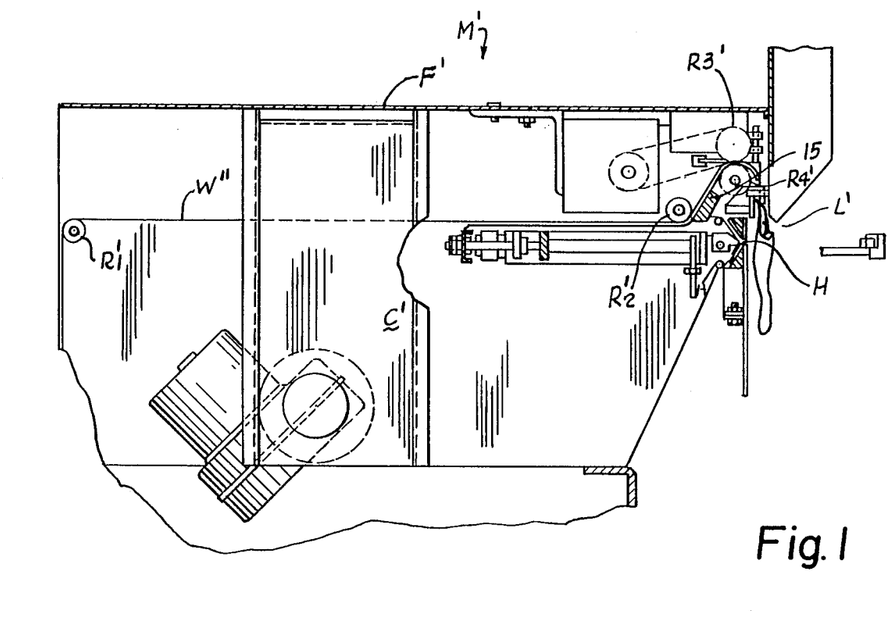
FIG. 1 is a drawing of a representative apparatus into which the present invention can be incorporated.

Referring to FIG. 1, a packaging machine in which the present invention is incorporated is shown generally at M. A pair of rubber rolls R1, R2 are supported by a frame F. A packaging web W of interconnected bag-like containers is fed vertically upwardly from a storage region, not shown, formed in the lower portion of the cabinet C. The web is reaved over a roller R1 and extends horizontally to the roller R2. From the roller R2 the web is directed downwardly and upwardly by a guide bar B and a pair of feed rollers R3, R4.

From the rolls R3, R4, the web is fed downwardly along a substantially vertical path to a loading station, indicated generally at L. A loading chute is provided for discharging contents into a bag positioned at the loading station.

A heater bar H is provided. A pair of gripper bars are positioned near the heater bar.

Mechanical means is provided for impinging the heater bar against the area of the bag which is to be sealed. Electrical power applied to the heater bar causes the heater bar temperature to rise to a level sufficient to effect a seal of the thermo-plastic material from which the bags are made.

Details of this machine are provided in U.S. Pat. No. 3,965,653, issued on June 29, 1976, particularly that portion of the patent which deals with the explanation of FIGS. 1-3. That patent is hereby expressly incorporated by reference.

Figure 2:
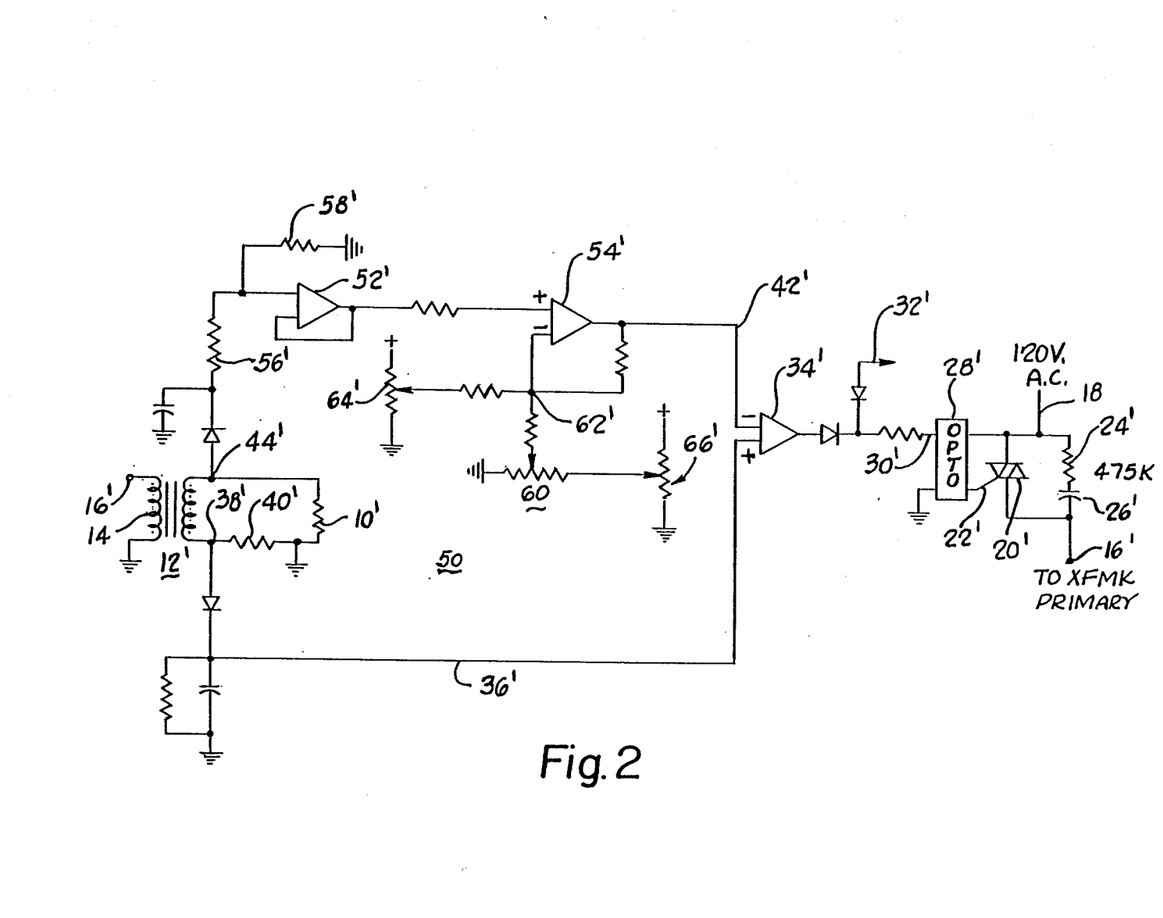
FIG. 2 is a schematic of a preferred circuit embodying this invention.

A circuit for controlling the temperature of a resistance heating sealing element 10 is shown in FIG. 2. The heating element, and the illustrated temperature control circuitry, are incorporated in an apparatus for effecting closure of thermoplastic bags by heat sealing. Examples of such an apparatus are described in the above identified U.S. Patents which are hereby expressly incorporated by reference. Machines which can incorporate this invention are known as Models H-55 and H-100, manufactured and sold by Automated Packaging Systems, Inc. of Twinsburg, Ohio, USA.

The heater element 10 in the preferred embodiment is a round stainless steel wire having a diameter of approximately one sixteenth inch and a length of at least about 4 inches. The stainless steel material comprising the heater element 10 exhibits resistivity which is an increasing function of temperature. That is to say, as the temperature of the heater element 10 rises, so does its resistance. Conversely, as the heater element 10 cools, its resistance drops.

Preferably, the heater element 10 comprises an electrically conductive material having a temperature co-efficient of resistivity of at least about 0.009.

While a preferred embodiment incorporates a round stainless steel wire, the invention is not to be considered limited to such an embodiment. Other configurations of heater elements are applicable as well in the context of the principals of this invention. For example, in some types of sealing operations, a ribbon of foil is suitable, such as a foil ribbon having a thickness about 0.005 inches and a width of three sixteenth inches to about three eighths inches. Other configurations can be used as well, such as a larger block type heater element in which a heater wire runs, such as in a recess or notch.

As the heater element becomes longer, however, it is often necessary to increase the voltage applied to the heater element by the electric power supply.

Tests have shown that satisfactory results in operation of embodiments of the present invention can be obtained when the temperature co-efficient of resistivity of the heater element material is between approximately 0.00094 and 0.00135. Other tests have shown that use of a material having a temperature co-efficient of resistivity of 0.00036 did not work well.

The heater element 10 is connected in series in the secondary circuit of a transformer 12. The transformer 12 is a stepdown transformer having a stepdown ratio of approximately 24, such that, when a 120 volt alternating current is applied to its primary, which is shown at reference character 14, the output across its secondary is approximately 5 volts.

Sufficient power is furnished through the transformer 12 to the heater element 10 to provide a current of approximately 28 amperes.

Referring to the right hand portion of FIG. 1, there is illustrated circuitry for applying the 120 volt alternating current signal to the primary 14 of the transformer 12.

This alternating current signal is applied at a terminal 16, identified at both the right and left hand portions of FIG. 2.

A lead 18 is coupled to a source of 120 volt AC power. This signal is directed through a triac 20. The triac can be controlled to go from a conductive state to a non-conductive state in known fashion by the condition of a signal appearing on a lead 22.

Connected in parallel with the triac 20 is an RC series brench including a 475K resistor 24 and a 1 microfarad capacitor 26. The leg comprising resistor 24 and capacitor 26 serves a suppression function to minimize effect of transients.

Control of the triac 20 is effected by an optical coupler 28. The optical coupler 28, in response to the appearance of a positive voltage at an input lead 30, produces a positive signal at the output lead 22 which turns the triac 20 to its "on" or conductive, state.

Initiation of application of power to the heater element 10 is effected by imposition of a positive "tickle" pulse at a lead 32. When a positive pulse is imposed at the lead 32, the optical coupler 28 causes the triac 20 to fire which in turn applies the 120 volt AC signal, by way of the lead 16, to the primary 14 of the transformer 12.

Subsequent operation of the optical coupler 28, in response to one or more subsequent tickle pulses appearing at the lead 32, will be discussed later, after an intervening discussion relating to feedback circuitry, which forms an important part of the embodiment of the present invention.

The input 30 to the optical coupler 28 is also fed by the output of a comparator 34. The comparator 34 produces a positive output only when the input voltage applied to its positive, or lower, input exceeds the voltage input to its negative, or upper, input terminal, as illustrated in FIG. 2. The positive input to the comparator 34 is fed by a lead 36, which is ultimately coupled to the secondary of the transformer 12 at a node 38.

A current sensing resistor 40 is in series in the secondary with the heater element 10. The node 38 is located at a point in the secondary such that, when current flows in the secondary, a positive signal is produced on the lead 36 which is a function of the value of the secondary current.

The negative input of the comparator 34 is fed by a signal at a lead 42. The voltage signal appearing at the lead 42 is a function of the voltage across the secondary of the transformer 12, at a point indicated by the reference character 44. The signal at the lead 42 usually has a non-varying positive value.

When the signal voltage at the lead 36 is greater than the signal at the lead 42, the comparator 34 produces a positive output which keeps the optical coupler 28 in a state that maintains the triac 20 in its conductive, or "on" condition. This in turn continues the application of power to the transformer primary, which continues application of electric power to the heater element 10.

If the signal at the lead 36 becomes less than the value of the signal at the lead 42, the comparator 34 then ceases to produce its output. Cessation of the output from the comparator 34 turns off the optical coupler, setting the triac 20 to its non-conductive state, cutting off power to the heater element 10.

When a tickle pulse is applied to the lead 32, the optical coupler 28 is initially turned on, initiating application of electric power to the heater element 10. Application of this power to the heater element 10 and to its associated transformer secondary circuit causes a positive voltage drop across the current sensing resistor 40, which in turn causes the appearance of a positive signal at the lead 36.

The parameters of the circuit associated with the lead 42 are selected such that, when power is initially applied to a cold heater element 10, the value of the transformer secondary current immediately becomes sufficiently high such that the output at the lead 36 is greater than that of the lead 42. Therefore, application of the tickle pulse at the lead 32 initiates application of power to the heater bar 10, and the current which immediately begins to flow in the secondary becomes sufficiently large to cause the comparator 34 to lock the optical coupler 28 to maintain the triac 20 in its conductive condition.

Meanwhile, the application of the voltage to the primary (and, generally speaking, to the secondary as well) remains substantially constant.

The thermal coefficient of resistivity of the heater element 10 is such that, as the temperature of the heater element 10 rises, so does the resistance of the element. This rise in resistance causes a corresponding reduction in the amount of secondary current flowing which is sensed by the sensing resistor 40. This means that, as the heater element 10 rises in temperature, the signal appearing at the lead 36 begins to drop.

When the signal on the lead 36 has dropped to a value equal to that of the signal at the lead 42, the comparator 34 ceases production of its output, which causes the optical coupler to turn the triac to its off condition, which prevents application of further electric power to the heater element 10.

Thus, if a single tickle pulse is applied to the lead 32, the heater element 10 begins to heat up, and continues heating up until it reaches such a temperature that the current producing the signal at the lead 36 drops to such a point that the signal at the lead 36 becomes less than the signal at the lead 42.

If, however, another tickle pulse occurs shortly after the output of the comparator 34 is discontinued, the heating cycle will be repeated.

It is desirable to apply the tickle pulses at a frequency at least as high as that needed to cause the circuit to input sufficient heat to the heater element to overcome thermal loss to the heater element sufficiently quickly to maintain the heater element to within a desired neighborhood of a predetermined steady state value. While the particular frequency used is a function of sealing parameters and, given the disclosure of this circuit, can be determined by one of ordinary skill, tests have shown that a tickle pulse application frequency of approximately 5 Hz. is appropriate for many applications.

It is desirable that the tickle pulses also be applied with sufficient frequency to compensate for the thermal loss rate which results from sealing at the intended repetition rate.

Preferably, each tickle pulse is approximately a square wave having a value of 5 volts and a width of approximately 10 milliseconds.

In the preferred embodiment, the heater bar 10 has a resistance of approximately 0.2 ohms, while the sensing resistor 40 has a resistance of approximately 0.05 ohms.

The circuit loop associated with the lead 42 is generally designated at reference character 50. The circuit loop 50 performs two functions. First, it compensates for any undesirable line variations in the voltage generated at the reference point 44 of the transformer secondary circuit. Second, it provides for heater temperature adjustment.

When these variations occur, the output of the lead 42 is adjusted in order to alter (slightly, if one assumes only slight line voltage variations) to adjust the power application to the lead 10 to maintain stable heating of the heater element 10. This is done by altering the secondary current level at which application of power is cut off by the comparator 34 in the manner described above in connection with and in response to current sensing.

If line voltage drops, the voltage signal appearing at the lead 42 is also reduced. This means that, in order for the comparator 34 to cut off power to the heater element, the voltage signal at the lead 36 must drop to a level lower than that at which power would be cut off if normal line voltage were reflected by the voltage signal at the lead 42.

When the secondary voltage measured at the point 44 is reduced, the heating cycle in the secondary transformer circuit is lengthened, because, under such circumstances, the current value to which secondary current must drop to cut off power is lower than that at which power is cut off if secondary voltage is normal.

It is important to note that this phenomenon occurring in the presence of reduced line voltage does not result in the heater element 10 becoming hotter than in the instance of normal line voltage. Precisely because the secondary voltage is reduced, predetermined current does not result in as much heating as occurs if normal secondary voltage were being applied at the same current. The longer heating cycle effected in the presence of reduced secondary voltage heats the heater element only to substantially the same temperature that would have been the case in the presence of normal line voltage, but a shorter heat cycle.

A second function of the loop 50 is to adjust the heater element temperature at which the present circuit maintains heater element stabilization in continuous operation.

The circuit loop 50 includes a voltage follower 52 and an adder 54 interposed in series between the reference point 44 and the lead 42. The voltage follower 52 is inserted in the circuit in order that the values of two series resistors 56, 58 can be chosen without substantially affecting the gain of the loop 50. It is desirable to be able to select the values of the resistors 56, 58, in order to calibrate the circuit to provide or select the voltage levels appearing at the lead 42 to have values, relative to the voltages at the lead 36, to enable the circuit to operate in the manner described herein. These values can be selected by one of ordinary skill in the art, given the disclosure of the present circuit, along with the parameters of the seals being effected by the heater element 10, such as the type and thickness of materials being sealed, and the area of the seal.

Referring to the temperature adjustment capability afforded by the loop 50, this temperature adjustment is accomplished by adjusting the wiper of a potentiometer 60 which is shown associated with the negative input of the adder circuit 54.

The adder circuit 54 produces a voltage output which is a function of the algebraic sum of the signals appearing respectively on its positive and negative inputs. As the value of the voltage signal appearing at its negative input increases, the output of the adder circuit decreases.

In order to raise the value at which the temperature of the heater element 10 stabilizes, one moves the wiper of the potentiometer 60 to the right as illustrated in FIG. 2. This movement elevates the value of the voltage signal appearing at a summing point 62. Elevation of the value at the point 62 reduces the output of the adder circuit 54. Assuming that the voltage appearing on the secondary circuit at point 44 remains constant, this reduces the output at the lead 42.

As discussed above, reduction of the voltage level at the lead 42 reduces the secondary current value at which power to the heater element is cut off. This means that, under such conditions, the heater element must reach a higher resistance, i.e., get hotter, than was the case before the wiper of the potentiometer 60 was moved to the right.

This phenomenon results in the heater element reaching and being maintained at a higher temperature as the wiper of the potentiometer 60 is moved to the right.

Potentiometers 64, 66 are provided for adjusting the range of heater element temperatures achievable by full movement of the wiper of the potentiometer 60 from one end to the other of its slidewire or equivalent element. For example, in the preferred embodiment, tests have shown that a preferable range of adjustment for stabilized heater bar temperature is between 200° F. to 700° F. In order to set up the sytem for this operation, the wiper of the potentiometer 60 is moved to its extreme left position as shown in FIG. 2 and the potentiometer 64 is adjusted to provide a heater temperature of 200° F. Similarly, the wiper of the potentiometer 60 is then moved to its extreme right position, and the wiper of the potentiometer 66 is adjusted to yield a heater temperature of 700° F. This results in the selectable temperature achievable by full excursion of the wiper of the potentiometer 60 is now established between 200° F. and 700° F.

This feature is to ensure that an operator will not inadvertently set the circuit for heater element temperature outside the preferred range.

Notwithstanding that the range of temperatures preferable for most sealing operations are described as above, tests have shown that this circuit can effectively maintain a substantially stable heater element temperature of as high as 1000° F.

The appropriate heater element temperature for any particular sealing operation can be selected by one of ordinary skill in the art based on sealing operation parameters such as heater element configuration, the area of the seal to be effected, the speed with which each individual sealing operation is to be performed, the rate of performance of sealing applications, and the type and thickness of the material being sealed.

Continuous operation of the present circuitry, achieved by a relatively rapid application of a continuous train of tickle pulses as described above, is very beneficial in rapid sealing operations extending over a long period of time, wherein the principal aim is simply to effect good, strong seals over the entire desired sealing area in as little time as possible, and without liquifying or burning through any of the layers of material being sealed together. The very stable heater temperatures maintained by this circuit assure that the heater element temperature will be high enough to soften the material sufficiently to effect good seals, but will not be so high as to cause burning through of the material or excessive liquification.

In addition to the benefits explained above, the heater circuit described herein, when operated in another mode, has particular advantages for making relatively large area seals on which it is desirable to emboss indicia. To effect a seal bearing embossed indicia, one must press the heating element against the seal area, then apply heating power to the sealing heater element and then allow the sealed area and the heating element to cool before releasing the sealed area from impingement by the heating element.

In order to effect such a seal, or series of such seals, the circuit described herein is operated in one, or a succession, of "one shot" cycles. These one shot cycles are accomplished by application of tickle pulses at the lead 32 at a significantly lower frequency than the train of tickle pulses used to operate the circuit to maintain a high and stable continuous heater element temperature.

As discussed above, tests were conducted in making series of embossed seals wherein heating control was done by adjusting the time during which power was applied to heat the seal as the series progressed. These operations were not particularly successful, and required excessive operator intervention in changing seal time duration. It is believed that the reason time adjustment is necessary is that, when a series of such embossed seals is performed, these times required for good seals vary substantially over a progression of seals.

The present inventor has recognized that, in order to make good, embossed seals in accordance with the procedure outlined above, the peak temperature reached by the heater element and by the material being sealed is of much greater significance in obtaining good seals than is the time of heat application.

The present circuit readily lends itself to implementation of this kind of peak temperature control.

When operated to effect embossed seals, only one tickle pulse is applied at the lead 32 for each seal which is made. The layers to be sealed are inserted between a pair of known, generally flat bars forming a type of clamp, one or both of which may incorporate a resistance heating element corresponding to the heater element 10 of FIG. 1. The clamp is closed on the layers to be sealed. A single tickle pulse is applied at the lead 32, initiating power application to the heater element 10. Current (and consequently heater element resistance and temperature) is monitored at the lead 36. The power remains applied to the heater element until it has reached a predetermined temperature, at which time the application of power ceases, and the heater bar and the sealed material cools. When the heater bar and material have cooled, the clamp of which the heater element is a part is released, and the embossed sealed material is removed prior to the application of a subsequent sealing operation.

As in the case of seals made by use of a heater element held at a substantially constant temperature, the peak temperature selected for making good embossed seals varies with the type and thickness of material being sealed and the desired seal area. In a preferred operation, however, in which it is desired to make seals with indicia using polyethelene bags 2 mils in thickness, with a seal area $\frac{1}{4}''$ wide, tests have shown that an effective peak temperature is about 300° F.

In such an embodiment, a heater element comprising a piece of stainless steel metallic foil was used, having a thickness of about 0.005 inches and a width of about three sixteenth inches.

As mentioned in earlier portions of this disclosure, the peak temperature reached by the heater element is controlled by the setting of the potentiometer 60.

It is to be understood that the present disclosure is intended as illustrative, rather than exhaustive, of the invention, and that those of ordinary skill in the art may be able to make certain additions or modifications to, or deletions from, the embodiments described in this disclosure without departing from the spirit or scope of the invention, as set forth in the appended claims.

I claim:

1. A method for stabilizing temperature of an electrically heated sealing element coupled to an energization circuit for intermittently applying electrical power to the sealing element, said method comprising the steps of:
   (a) monitoring an electrical parameter associated with said sealing element, which parameter is a function of sealing element temperature, and
   (b) changing the duty cycle of said energization circuit in response to said monitoring step.

2. The method of claim 1, wherein said monitoring step comprises:
   monitoring current flowing through said heating element.

3. The method of claim 1, further comprising the steps of:
   (a) monitoring voltage applied to a circuit comprising said sealing element, and
   (b) adjusting said applied voltage in response to said voltage monitoring.

4. The method of claim 1, said duty cycle changing step comprising:
   controlling operation of said intermittent energization circuit in response to said monitoring step for maintaining sealing element temperature at substantially a predetermined uniform level with respect to time.

5. A heat sealing circuit comprising:
   (a) a heat sealing element;
   (b) an energization circuit coupled for intermittently applying electrical energy to said heat sealing element;
   (c) circuit means for monitoring an electrical parameter associated with at least one of said energization circuit and said sealing element, the value of said parameter being a function of heating element temperature, and
   (d) means for controlling the duty cycle of said intermittent energization circuit in response to said monitoring means.

6. The circuit of claim 5 wherein:
   said sealing element is metallic and electrically primarily resistive.

7. The circuit of claim 6, wherein:
   said monitoring means includes circuitry for monitoring current flow through said sealing element.

8. The circuit of claim 7, wherein said controlling means further comprises:
   means responsive to said current flow for varying the duty cycle of application of power to said heating element in response to changes in said current flow.

9. The circuit of claim 8, further comprising:
   means for sensing the magnitude of application of electrical potential to a circuit including said heating element, and means for compensating in response to changes in said electrical potential.

10. The system of claim 5, wherein:

(a) said controlling means includes means for controlling operation of said energization circuit for maintaining said sealing element temperature at a predetermined value, and (b) further comprising means for adjusting said predetermined value.

11. An electrical heat sealing circuit comprising:

(a) an electrically conductive heater element comprising a material whose resistivity is a function of temperature;

(b) an energization circuit coupled to apply electrical energy to cause current flow through said heater element;

(c) a sensing resistor in series with said heater element;

(d) means for monitoring voltage drop across said sensing resistor, and (e) control circuitry responsive to said monitored voltage drop for adjusting the duty cycle of said energization circuit to stabilize heater element temperature at a predetermined value.

12. The circuit of claim 11, further comprising: circuit means for adjusting said predetermined value.

13. The circuit of claim 11, further comprising:

(a) means for sensing voltage applied to a circuit including said heater element, and (b) means responsive to said sensed voltage for compensating to avoid heater element temperature changes as a result of such voltage changes.

14. The circuit of claim 11, further comprising: circuitry for effecting one of the initiation or continuance of application of electrical power to said heater element in response to said monitored current being at least a predetermined value, and for interrupting application of electrical power to said heater element in response to said monitored current being less than said predetermined value.

15. A method for maintaining and stabilizing temperature of an electrically conductive heater element coupled to an electrical energization circuit, said heater element having a resistivity which varies as an increasing function of temperature, said method comprising the steps of:

(a) monitoring electrical current flow through said heater element, and (b) influencing operation of said energization circuit in response to said current monitoring step, as follows:

(i) interrupting power applied to said heater element in response to a reduction in said monitored electrical current, and (ii) continuing application of electric power to said heater element in response to said current being greater than a predetermined value.

16. A method for maintaining and stabilizing temperature of a resistance heating sealer element utilizing an electrical energization circuit coupled to cause electric current flow through said sealing element, the resistivity of said sealing element being a function of temperature, said method comprising the step of:

(a) detecting change in resistance of said sealing element by sensing change in an operating parameter of the energization circuit and influencing, by feedback means, operation of said energization circuit in response to said detected resitance.

17. A method for stabilizing and maintaining temperature of a resistance heater element, utilizing an electrical energization circuit coupled to deliver intermittent electrical energy to said heater element, said method comprising the steps of:

(a) sensing current flow through said heater element;

(b) continuing average power applied to said intermittent energization circuit in response to said sensed electrical current being at least a predetermined value, and (c) interrupting power applied to said heater element by said energization circuit in response to a decrease in said sensed current.

18. An electrical apparatus for effecting control of temperature of a sealing heater element, said apparatus comprising:

(a) the electrically conductive heater element;

(b) an electrical energization circuit coupled to intermittently apply electrical energy to said heater element, and (c) means for sensing electrical current flow through said heater element, and (d) control circuitry coupled between said current sensing means and said electrical energization circuitry, said control circuitry being operable to:

(i) maintaining application of electrical power to said heater element in response to an increase in sensed electrical current, and (ii) interrupt electrical power to said heater element in response to a decrease in said sensed current through said heater element.

19. Apparatus for effecting packaging utilizing a web of inter connected heat-sealable bags, said apparatus comprising:

(a) apparatus for advancing a succession of said bags along a path;

(b) structure defining a loading station along said path past which said bags are successively advanced for loading;

(c) structure defining a sealing station downstream along said path from said loading station;

(d) a heat sealer element;

(e) means for selectively moving said heat sealer element to a location proximate a bag when located at said sealing station to effect a heat seal of said bag;

(f) an energization circuit coupled for intermittently applying electrical power for heating said sealer element;

(g) a sensing resistor in series with said sealer element;

(h) means for monitoring electrical current through said sensing resistor and said sealer element;

(i) control means interposed between said sensing resistor and said energization circuit for controlling the duty cycle of said circuit as follows:

(i) interrupting application of power to said sealing element in response to a reduction in sensed current, and (ii) continuing application of power to said sealer element in response to said current being of at least a predetermined value, and (j) structure defining a bag detaching station downstream along said path from said sealing station.

20. Apparatus and circuitry for effecting heat sealing, said apparatus and circuitry comprising:

(a) an electrically resistive heater element comprising a material whose resistivity increases as a function of temperature;

(b) a current sensing resistor in series with said heater element;

(c) an energization circuit coupled for causing electrical current to flow intermittently through said heater element and said sensing resistor by intermittent application of a desirably fixed electrical potential;

(d) means for monitoring electrical current through said sensing resistor;

(e) control means coupled between said sensing resistor and said energization circuit for decreasing the duty cycle of said energization circuit in response to a decrease in said sensed current, and for increasing or maintaining the duty cycle of said energization circuit in response to said current being above a predetermined value;

(f) means for sensing the magnitude of said electrical potential;

(g) means responsive to said sensed potential to regulate operation of said energization circuit to compensate for undesirable changes in said desirably fixed potential to maintain said heater element at a substantially constant temperature notwithstanding undesirable potential changes; and (h) means for adjusting said predetermined current value.

21. A method for heat sealing layers of a thermoplastic material, said method comprising the steps of:

(a) moving an electrically heatable resistance heating element proximate an area to be sealed prior to application of electric power to said heating element;

(b) applying electric power to heat said heating element to effect a seal;

(c) monitoring temperature of said heating element by measuring current flowing through said heating element in response to the application of a substantially constant voltage;

(d) cutting off electric power to said heating element in response to said heating element having reached a predetermined temperature as indicated by said measured current;

(e) maintaining said heating element proximate said area to be sealed subsequent to said electric power cut-off; and (f) moving said heating element away from said sealed area.

22. A method for controlling temperature of an electrically heated primarily resistive sealing element coupled to an energization circuit for applying electrical power to the sealing element, said method comprising the steps of:

(a) monitoring changes in resistance of said sealing element, and (b) adjusting the duty cycle of said energization circuit in response to said monitoring step.

23. A system for maintaining a resistive heating element near a predetermined temperature, said system comprising:

(a) a transformer having a primary and a secondary;

(b) a circuit including the transformer secondary and said resistive heating element for applying electric current to said heating element;

(c) means for sensing the amount of electric current flow in said heating element;

(d) means for selectively coupling and decoupling said primary of said transformer to an external source of alternating electrical voltage;

(e) tickle pulse means for initiating coupling of said transformer primary to said voltage source in response to a pulse generated by said tickle pulse means;

(f) comparator means coupled to said coupling and decoupling means and responsive to said current sensing means for causing the decoupling of said voltage source from said transformer primary in response to the sensing of said current being less than a predetermined amount, and (g) said tickle pulse means comprising means for generating a subsequent pulse at a time subsequent to said decoupling.

24. The system of claim 23, wherein said coupling and decoupling means comprises an optical coupler responsive to said comparator means and a solid state switching element coupled to receive and be responsive to the output of said optical coupler.

25. The system of claim 24, wherein said tickle pulse means comprises means for generating a rapid succession of said pulses to repeatedly re-initiate application of said voltage to said transformer primary after each of a series of decouplings.

26. The system of claim 25, wherein:
said tickle pulse means produces pulses at a frequency in the neighborhood of 5 Hz.

27. A system for temperature stabilization of an electrically heated mainly resistive heating element, said system comprising:

(a) a transformer having a primary and a secondary;

(b) a sensing resistor whose resistance is known and small compared with the resistance of said heating element and means for sensing current flow through said sensing resistor;

(c) means for conductively coupling said heating element and said sensing resistor in series to said transformer secondary in a circuit without substantial other resistive impedance;

(d) means for selectively coupling and decoupling said transformer primary to a source of alternating electrical voltage;

(e) means for initiating coupling of said primary to said voltage source, and (f) means associated with said coupling and decoupling means and responsive to current sensed in said sensing resistor being below a predetermined level to decouple said voltage from said transformer primary.

* * * * *